United States Patent
Hurd

(10) Patent No.: US 10,142,538 B2
(45) Date of Patent: Nov. 27, 2018

(54) LIDAR ASSISTED FOCUSING DEVICE

(71) Applicant: REDROCK MICROSYSTEMS, LLC, Flower Mound, TX (US)

(72) Inventor: James D. Hurd, Flower Mound, TX (US)

(73) Assignee: REDROCK MICROSYSTEMS, LLC, Flower Mound, TX (US)

( * ) Notice: Subject to any disclaimer, the term of this patent is extended or adjusted under 35 U.S.C. 154(b) by 0 days.

(21) Appl. No.: 15/052,553

(22) Filed: Feb. 24, 2016

(65) Prior Publication Data

US 2016/0248969 A1 Aug. 25, 2016

Related U.S. Application Data

(60) Provisional application No. 62/120,095, filed on Feb. 24, 2015.

(51) Int. Cl.
| | | |
|---|---|---|
| *H04N 5/232* | (2006.01) | |
| *G01S 17/88* | (2006.01) | |
| *G01S 17/42* | (2006.01) | |
| *G02B 7/40* | (2006.01) | |
| *G01S 17/08* | (2006.01) | |
| *G01S 7/481* | (2006.01) | |

(52) U.S. Cl.
CPC ......... *H04N 5/23216* (2013.01); *G01S 17/08* (2013.01); *G01S 17/42* (2013.01); *G01S 17/88* (2013.01); *G02B 7/40* (2013.01); *H04N 5/23212* (2013.01); *G01S 7/4813* (2013.01); *H04N 5/23293* (2013.01)

(58) Field of Classification Search
CPC .......... H04N 5/23216; H04N 5/23212; H04N 5/23293; G02B 7/40; G01S 17/08; G01S 17/42; G01S 17/88; G01S 7/4813
See application file for complete search history.

(56) References Cited

U.S. PATENT DOCUMENTS

| | | | |
|---|---|---|---|
| 7,965,314 B1* | 6/2011 | Miller | G08B 13/19643 250/330 |
| 2011/0043679 A1* | 2/2011 | Lee | G01S 17/026 348/348 |
| 2012/0081544 A1* | 4/2012 | Wee | G01S 17/023 348/140 |
| 2013/0194421 A1* | 8/2013 | Kita | H04N 7/18 348/143 |
| 2013/0226344 A1* | 8/2013 | Wong | G05D 1/024 700/258 |
| 2015/0170526 A1* | 6/2015 | Wang | B64C 19/00 701/16 |

(Continued)

*Primary Examiner* — Albert H Cutler
(74) *Attorney, Agent, or Firm* — Daniel J. Chalker; Chalker Flores, LLP

(57) ABSTRACT

A focusing device for a camera having a lens includes a LIDAR module, a camera interface and a controller communicably coupled to the LIDAR module and the camera interface. The controller receives data from the LIDAR module, displays one or more targets using the data from the LIDAR module via a user interface, receives a target selection via the user interface, determines a focus setting using the LIDAR data, the target selection and a camera operational data, and sends the focus setting to the camera interface. The camera interface receives the focus setting and drives the lens of the camera to focus on the target selection using the focus setting.

19 Claims, 2 Drawing Sheets

(56) References Cited

U.S. PATENT DOCUMENTS

| | | | |
|---|---|---|---|
| 2016/0119553 A1* | 4/2016 | Alm | H04N 5/272 |
| | | | 348/143 |
| 2016/0182814 A1* | 6/2016 | Schwesinger | H04N 7/147 |
| | | | 348/14.03 |
| 2016/0282874 A1* | 9/2016 | Kurata | G05D 1/0289 |
| 2016/0313445 A1* | 10/2016 | Bailey | G01S 7/481 |

* cited by examiner

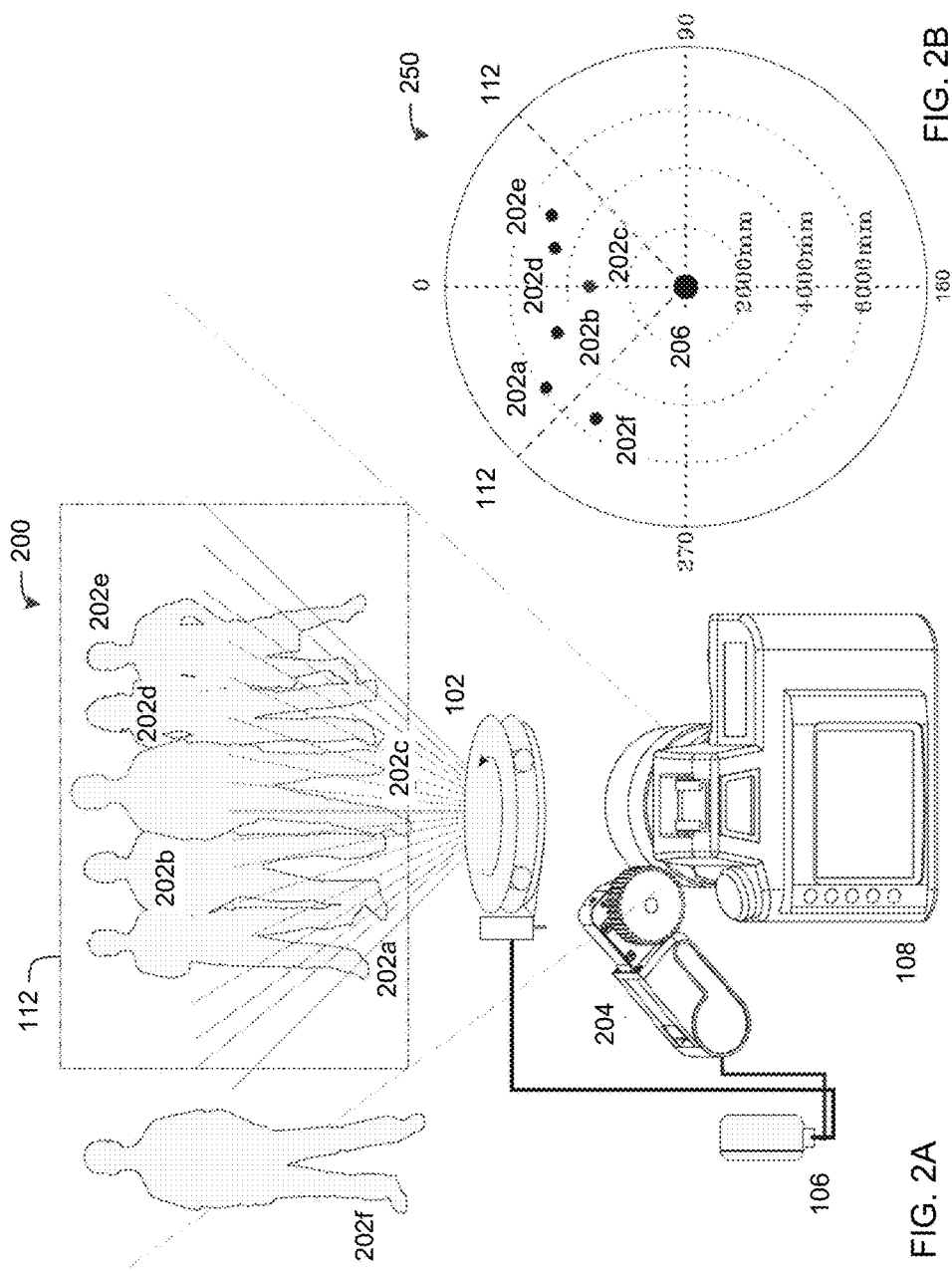

LIDAR ASSISTED FOCUSING DEVICE

CROSS-REFERENCE TO RELATED APPLICATIONS

This non-provisional Patent Application claims priority to U.S. Provisional Patent Application Ser. No. 62/120,095, filed Feb. 24, 2015, entitled "LIDAR Assisted Focusing System," the contents of which is incorporated by reference herein in its entirety.

INCORPORATION-BY-REFERENCE OF MATERIALS FILED ON COMPACT DISC

None.

TECHNICAL FIELD OF THE INVENTION

The present invention relates in general to optics and more specifically to a LIDAR assisted focusing device.

STATEMENT OF FEDERALLY FUNDED RESEARCH

None.

BACKGROUND OF THE INVENTION

Without limiting the scope of the invention, its background is described in connection with camera focusing systems. Many focusing systems are limited to a field of view of less than one degree. Moreover, people must often rely only on the auto focusing system integrated into their camera.

SUMMARY OF THE INVENTION

One embodiment of the present invention provides a focusing device for a camera having a lens that includes a LIDAR module, a camera interface and a controller communicably coupled to the LIDAR module and the camera interface. The controller receives data from the LIDAR module, displays one or more targets using the data from the LIDAR module via a user interface, receives a target selection via the user interface, determines a focus setting using the LIDAR data, the target selection and a camera operational data, and sends the focus setting to the camera interface. The camera interface receives the focus setting and drives the lens of the camera to focus on the target selection using the focus setting.

Another embodiment of the present invention provides a focus/pan/tilt device for a camera having a lens and a pan/tilt mechanism that includes a LIDAR module, a camera interface and a controller communicably coupled to the LIDAR module and the camera interface. The controller receives data from the LIDAR module, displays one or more targets using the data from the LIDAR module via a user interface, receives a target selection via the user interface, determines a focus setting, a pan setting and a tilt setting using the LIDAR data, the target selection and a camera operational data, and sends the focus setting, the pan setting and the tilt setting to the camera interface. The camera interface receives the focus setting and drives the lens of the camera to focus on the target selection using the focus setting, and receives the pan setting and tilt setting and drives the pan/tilt mechanism to track a movement of the target selection using the pan setting and the tilt setting.

BRIEF DESCRIPTION OF THE DRAWINGS

For a more complete understanding of the features and advantages of the present invention, reference is now made to the detailed description of the invention along with the accompanying figures and in which:

FIG. 2A is a diagram illustrating a focusing device connected to a camera viewing a scene in accordance with one embodiment of the present invention; and FIG. 2B is a diagram illustrating a display of potential target on a user interface in accordance with one embodiment of the present invention.

DETAILED DESCRIPTION OF THE INVENTION

Figure 1:
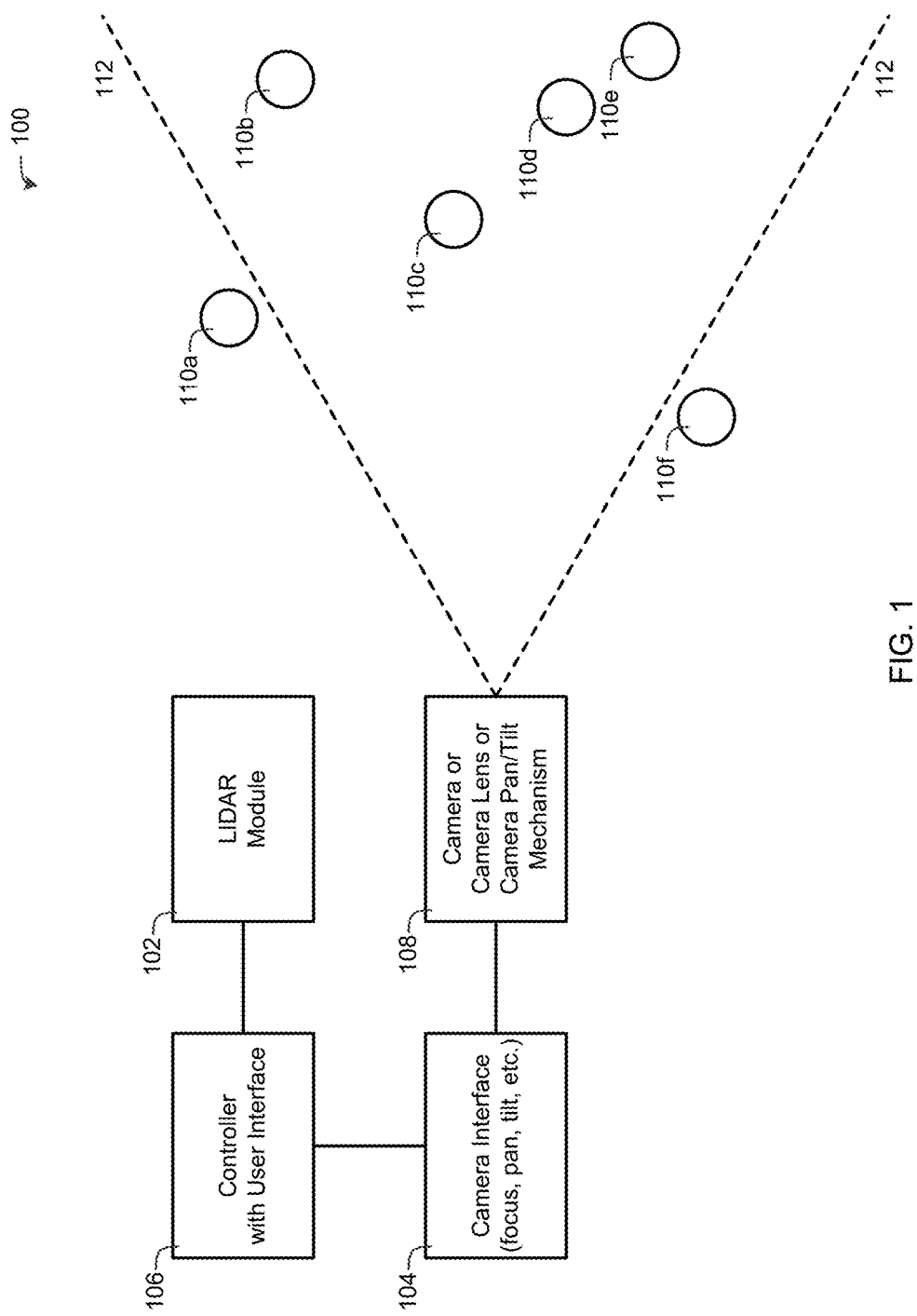
FIG. 1 is a block diagram of a focusing device in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. For example, the embodiments described below relate to focusing a camera lens.

Now referring to FIG. 1, a block diagram depicting a focusing device 100 in accordance one embodiment of the present invention is shown. The focusing device 100 includes a LIDAR module 102, one or more camera interfaces 104 and a controller 106 communicably coupled to the LIDAR module 102 and the one or more camera interfaces 104. The LIDAR module 102 is a rotating laser distance scanner capable of scanning up to 360 degrees of data. Typically, the LIDAR module 102 is mounted to the bottom or top of the camera 108, and is communicably coupled to the controller 106 via an electrical cable, conductors, wireless connection, etc.

The controller 106 is typically mounted near the LIDAR module 102 or the camera interface(s) 104, and is communicably coupled to the camera interface(s) 104 via an electrical cable, conductors, wireless connection, etc. Note that they controller 106 can be integrated into or part of the LIDAR module 102 or the camera interface(s) 104. The controller 106 includes an integrated user interface, a separate user interface communicably coupled to the controller 106 or both. The user interface can be a display screen, touch screen, buttons, dials, speaker, microphone or other controls. Moreover, the user interface can be application software operating on a mobile device, such as a phone, laptop, tablet, etc. The focusing device 100 can be powered by a battery, a solar cell, a power connector, or a combination thereof In addition, a mounting assembly can be used to attach the components together with the camera.

The one or more camera interfaces 104 perform one or more of the following functions: focus the camera lens 108, zoom the camera lens 108, pan the camera 108, tilt the camera 108, or a combination thereof. These functions can be performed mechanically (e.g., motor, motor with a gear or belt drive, etc.) or electronically (e.g., control signals sent to the camera, camera controller, pan/tilt/stabilization device, etc.). The one or more camera interfaces 104 are initialized or calibrated using any camera operational data (e.g., movement or signal required to drive the lens, zoom, pan or tilt a specified amount, any mechanical stops such as minimum and maximum focus or zoom, etc.) necessary to properly adjust the focus, zoom, pan or tilt of the camera based on the data received from the LIDAR module 102.

In operation, the LIDAR Module 102 rotates continuously and creates a 360 degree scan of an area (or less). The controller 106 receives data from the LIDAR module 102 and displays one or more targets 110a-f using the data from the LIDAR module 102 via the user interface. Note that the camera field of view illustrated by dashed lines 112 would exclude targets 110a and 110f. The operator makes a target selection (e.g., 110d, etc.) via the user interface. The controller 106 then determines a focus, zoom, pan and/or tilt setting(s) using the data from the LIDAR module 102, the target selection (e.g., 110d, etc.) and the camera operational data. Note that the controller 106 could also determine a f-stop setting if multiple target selections were made. The controller 106 then sends the focus, zoom, pan and/or tilt setting(s) to the camera interface(s) 104, which drive the lens and/or motors to adjust the focus, zoom or camera to the correct position. The controller 106 can operate in a continuous mode in which the camera is automatically adjusted to focus and track a moving target selection (e.g., 110d, etc.).

Referring now to FIG. 2A, a diagram illustrating a focusing device connected to a camera viewing a scene (collectively 200) in accordance with one embodiment of the present invention is shown. The camera 108 has a field of view represented by the rectangle 112 in which five people 202a-e are shown. Person 202f is outside the field of view 112. In this example, the focusing device includes a LIDAR module 102, a motor 204 with a gear that interfaces with the camera lens focusing ring, and a controller 106 communicably coupled to the LIDAR module 102 and the motor 204. The LIDAR module 102 is a rotating laser distance scanner capable of scanning up to 360 degrees of data as illustrated in FIG. 2B showing a display 250 of the potential targets 202a-f on the user interface of the controller 106. The position of the camera 108 is indicated by point 206. Other graphical representations of the LIDAR data can be used. The operator selects person 202c by touching the screen 250, pressing one or more knobs, turning a dial or by some other type of control (e.g., voice command, etc.). The display 250 highlights the displayed FIG. 202c to indicate that it is the target selection, and the controller 106 determines a focus setting(s) using the data from the LIDAR module 102, the target selection 202c and the camera operational data. The controller 106 then sends the focus setting to the motor 204, which drives the lens to adjust the focus to the correct position.

Now referring back to FIG. 1, another embodiment of the present invention provides a focus/pan/tilt device 100 for a camera 108 having a lens and a pan/tilt mechanism that includes a LIDAR module 102, a camera interface 104 and a controller 106 communicably coupled to the LIDAR module 102 and the camera interface 104. The controller 106 receives data from the LIDAR module 102, displays one or more targets using the data from the LIDAR module 102 via a user interface, receives a target selection via the user interface, determines a focus setting, a pan setting and a tilt setting using the LIDAR data, the target selection and a camera operational data, and sends the focus setting, the pan setting and the tilt setting to the camera interface 104. The camera interface 104 receives the focus setting and drives the lens of the camera 108 to focus on the target selection using the focus setting, and receives the pan setting and tilt setting and drives the pan/tilt mechanism 108 to track a movement of the target selection using the pan setting and the tilt setting.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

To facilitate the understanding of this invention, a number of terms are defined below. Terms defined herein have meanings as commonly understood by a person of ordinary skill in the areas relevant to the present invention, and their usage does not delimit the invention, except as outlined in the claims. Terms such as "a", "an" and "the" are not intended to refer to only a singular entity, but include the general class of which a specific example may be used for illustration, such as "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the devices, compositions and/or methods disclosed and claimed herein can be made and executed without undue experimentation in light of the present disclosure. While the devices, compositions and methods of this invention have been described in terms of preferred embodiments, it will be apparent to those of skill in the art that variations may be applied to the devices, compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A focusing device for a camera having a lens and a field of view, the focusing device comprising:
   a LIDAR module having a scanning area greater than the field of view of the camera;
   a camera interface;
   a controller having a user interface with a display, the controller communicably coupled to the LIDAR module and the camera interface, wherein the controller receives data from the LIDAR module, displays a location of one or more targets within the scanning area along with an indication of the field of view of the camera using the data from the LIDAR module via a user interface, receives a target selection from the displayed target(s) via the user interface, determines a focus setting using the LIDAR data, the target selection and a camera operational data, and sends the focus setting to the camera interface; and
   the camera interface receives the focus setting and drives the lens of the camera to focus on the target selection using the focus setting.

2. The focusing device as recited in claim 1, further comprising a mounting assembly attached to the camera, wherein the LIDAR module and the camera interface are affixed to the mounting assembly.

3. The focusing device as recited in claim 1, wherein:
   the camera interface further comprises a pan and/or tilt interface communicably coupled to the controller; and
   the controller further determines a pan and/or tilt setting using the LIDAR data, the target selection and the camera operational data, and sends the pan and/or tilt setting to the pan and/or tilt interface; and
   the pan and/or tilt interface receives the pan and/or tilt setting and drives the pan and/or tilt interface to track a movement of the target selection.

4. The focusing device as recited in claim 3, wherein the controller automatically tracks the target selection by adjusting the focus setting and the pan and/or tilt setting.

5. The focusing device as recited in claim 1, wherein the controller receives the camera operational data and initializes or calibrates the camera interface.

6. The focusing device as recited in claim 1, wherein the camera interface comprises a motor operably connected to a focusing ring of the lens or a communications interface with the camera such that the camera auto focuses the lens according to the focus setting.

7. The focusing device as recited in claim 1, wherein the controller is communicably coupled to the LIDAR module and the camera interface via a wireless transceiver, a cable, a wire or a combination thereof.

8. The focusing device as recited in claim 1, further comprising a power source connected to the LIDAR module, the controller and the camera interface.

9. The focusing device as recited in claim 1, wherein the user interface comprises an application software operating on a mobile device and communicably coupled to the controller.

10. The focusing device as recited in claim 1, wherein at least one of the displayed target(s) is outside the field of view of the camera.

11. A focus/pan/tilt device for a camera having a lens, a field of view and a pan/tilt mechanism, the focusing device comprising:
    a LIDAR module having a scanning area greater than the field of view of the camera;
    a camera interface;
    a controller having a user interface with a display, the controller communicably coupled to the LIDAR module and the camera interface, wherein the controller receives data from the LIDAR module, displays a location of one or more targets within the scanning area along with an indication of the field of view of the camera using the data from the LIDAR module via a user interface, receives a target selection from the displayed targets via the user interface, determines a focus setting, a pan setting and a tilt setting using the LIDAR data, the target selection and a camera operational data, and sends the focus setting, the pan setting and the tilt setting to the camera interface; and
    the camera interface receives the focus setting and drives the lens of the camera to focus on the target selection using the focus setting, and receives the pan setting and tilt setting and drives the pan/tilt mechanism to track a movement of the target selection using the pan setting and the tilt setting.

12. The focus/pan/tilt device as recited in claim 11, further comprising a mounting assembly attached to the camera, wherein the LIDAR module and the camera interface are affixed to the mounting assembly.

13. The focus/pan/tilt device as recited in claim 11, wherein the controller automatically tracks the target selection by adjusting the focus setting, the pan setting and the tilt setting.

14. The focus/pan/tilt device as recited in claim 11, wherein the controller receives the camera operational data and initializes or calibrates the camera interface.

15. The focus/pan/tilt device as recited in claim 11, wherein the camera interface comprises:
    a motor operably connected to a focusing ring of the lens or a communications interface with the camera such that the camera auto focuses the lens according to the focus setting; and
    a connection to the pan/tilt mechanism.

16. The focus/pan/tilt device as recited in claim 11, wherein the controller is communicably coupled to the LIDAR module and the camera interface via a wireless transceiver, a cable, a wire or a combination thereof.

17. The focus/pan/tilt device as recited in claim 11, further comprising a power source connected to the LIDAR module, the controller and the camera interface.

18. The focus/pan/tilt device as recited in claim 11, wherein the user interface comprises an application software operating on a mobile device and communicably coupled to the controller.

19. The focus/pan/tilt device as recited in claim 11, wherein at least one of the displayed target(s) is outside the field of view of the camera.

* * * * *